April 16, 1963   F. A. DALY   3,086,159
BATTERY CHARGING REGULATION
Filed March 31, 1958
FIG. I.
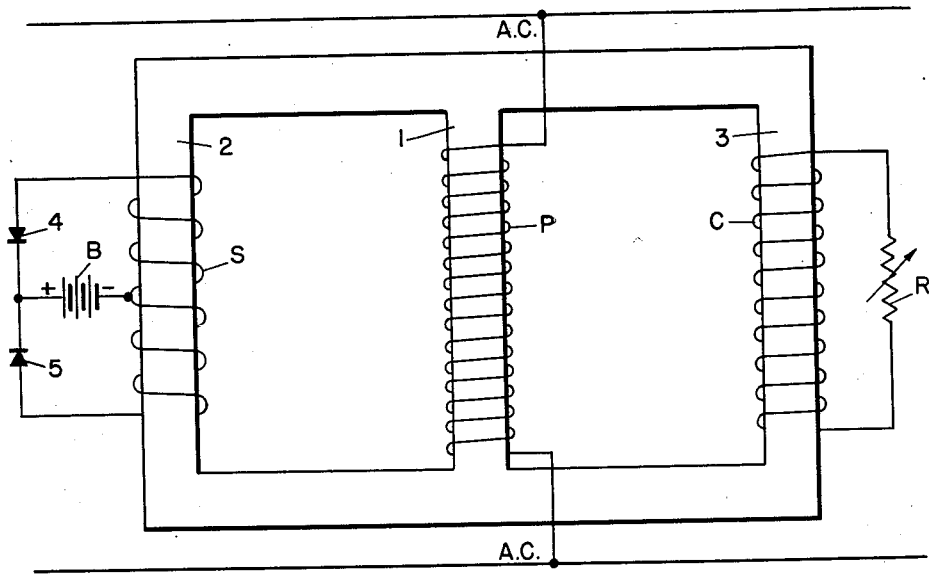
FIG. 2.
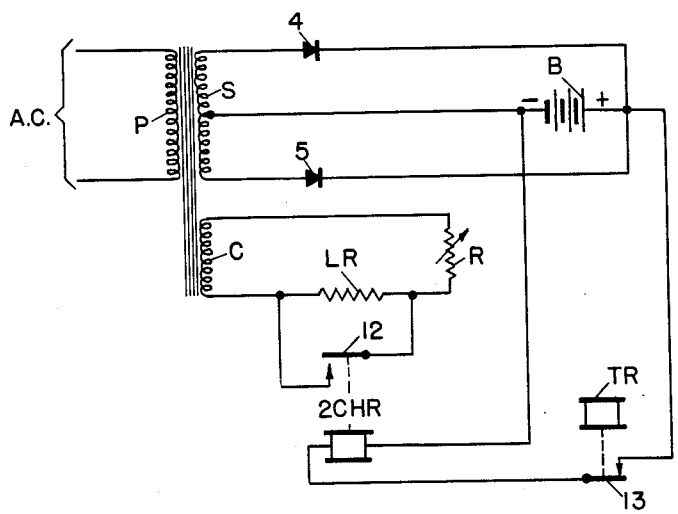
INVENTOR.
F.A. DALY
BY
HIS ATTORNEY United States Patent Office 3,086,159
Patented Apr. 16, 1963

3,086,159
BATTERY CHARGING REGULATION
Frank A. Daly, Rochester, N.Y., assignor to General Railway Signal Company, Rochester, N.Y.
Filed Mar. 31, 1958, Ser. No. 725,189
4 Claims. (Cl. 320—39)

This invention relates to a battery charging regulation system and more particularly to an organization comprised in part of a transformer and a rectifier for supplying direct current energy from an alternating current source to a storage battery.

In the usual battery charging regulation system, the charge delivered to a storage battery is regulated in accordance with the amount of current drawn from the battery by a particular load. Hence, the load current drawn from the battery and the charging current supplied to the battery assist in saturating a reactor core to reduce the impedance of the primary coil and increase the charging current delivered to the battery in response to an increase in the load current drawn from the battery.

In the present invention, the regulation of the amount of charging current supplied to the storage battery has been isolated from the battery charging circuit. Accordingly, the magnetic core structure of the transformer carrying the usual primary and secondary windings has been provided with a third winding, wound on a third core leg or leakage strip, said winding being directly connected to a variable resistance. It will be seen that the effect of the additional winding changes the magnetic coupling which in turn changes the number of flux linkages between the primary and secondary windings.

Hence, one object of the present invention is to provide an improved means for coupling a leakage strip to the usual transformer structure for governing the changes in flux linkages inherent in the windings of the transformer over a controlled range of variable loads.

Another object of the present invention is to provide a precise but relatively simple means of flux control in a transformer structure for regulating the amount of charging current supplied to a storage battery under any given set of conditions.

Various other objects, purposes and characteristic features of the present invention will be in part apparent, and in part pointed out as the description progresses.

FIG. 1 is a diagrammatic view showing the preferred core structure across each specific winding; and FIG. 2 is a circuit diagram of a control circuit for a battery charging rectifier used in conjunction with a two-rate relay.

The core structure shown in FIG. 1 is made up of a series of laminations having alternately arranged E–I stamped plates in a manner so as to have the same net cross sectional area for each core. The three-legged structure has the primary winding on the middle leg and the secondary and control windings located on the outside legs. The primary winding is directly connected across the terminals of a suitable source of alternating current. The control winding is directly connected across a variable load, and the secondary winding is connected through a fullwave rectifier to the terminals of a standard storage battery.

It should be understood that the dimensions of the core portions of the transformer, the number of turns in the windings, the size of wire, etc., are, of course, each proportioned commensurate with the applied alternating current voltage and the load characteristics. The principle involved in the operation is however, the same, so that after a proper assumption of the load current required has been arrived at, and the structure proportioned accordingly, the magnetic characteristics and results thereof are based upon the same underlying principle of operation. This principle, briefly, provides that there is a resistance in the closed circuit of the control winding which is manually controlled by a rheostat for at times increasing the reluctance of the control core leg to regulate the charging rate to the battery which has been placed in the circuit of the secondary winding.

A rheostat is used to increase or decrease the load across the control winding. A tapered rheostat, of the nature well known to those skilled in the art, has been found to be the most practical in the present application because it solves the usual problems of high current at low resistance and low current at high resistance along with its inherent improvement in the control characteristics of the direct current output, the latter having been exhibited numerous times in publications containing a graphical analysis of the output compared to the rotation of the rheostat control. As will be pointed out in more detail later on, the rheostat provides a manual means for minutely varying the resistance to obtain a high degree of differentiation in the applied load connected across the control winding, so as to make it possible to alter the charging rate to the storage battery within well defined limits.

The alternating flux provided by the current passing through the primary coil P has a magnetic circuit which is completed through that core leg 2 containing the secondary winding S and another magnetic circuit through that core leg 3 containing the control winding C. The control leg 3 then forms a magnetic shunt for the core portion of the magnetic circuit coupling the primary winding P and the secondary winding S. The reluctance of this control leg 3 depends in part on the permeability which in turn is dependent in part upon the flux density. The alternating flux supplied from the primary winding P, when energized by the alternating current energy, produces a certain flux density in the control winding C and thereby determines its permeability and magnetic reluctance.

Assuming that the battery B is fully charged and that the control winding is open circuited, the flux generated in the primary core divides equally along the secondary and control core legs. Under this condition the control core leg acts as a leakage strip and there will be no charging current delivered to the battery. Now if we assume that a load is placed across the control winding in a series circuit, the resistance therefore changing from an infinite value to a given value, the reluctance in the control core leg will be altered which will in turn change the ratio of the flux distribution and cause a charge current to be delivered to the battery. When this resistance across the control winding is decreased, the reluctance of the control core leg will increase and cause more flux to pass through the secondary core leg, resulting in an increased charging current. When the resistance across the control core leg is increased, the reluctance in the control core leg will be decreased and more of the flux generated by the primary will pass through the control core leg and result in a decreased charging current being delivered to the battery.

To illustrate the requirements in detail for one specific example of a particular battery charging regulator organization, but by no means or intent limiting the scope of the present invention to such example, a six-cell battery has been chosen to be charged at a 1-ampere charging rate. The terminal voltage therefore being 13.5 volts, the transformer operating at 60% efficiency would require a 22.5 volt-ampere rating. The usual reactive type transformer was used and from the operating characteristics of said reactive type transformer, thirteen turns per volt is required. Using a 115 volt primary coil would require 1500 turns giving it a current capacity of .196 ampere.

Using a no-load to load ratio of 1.63 for the secondary coil, the number of turns required for the secondary is 286. Since the secondary is a center tap coil, the number of turns actually required is 572, each half of the winding supplying only one ampere, half of the time during operation. The number of turns in the control winding is dependent for the main part upon what current is desired in the control circuit and also is governed by the capacity of the rheostat selected. Since the current increases as the number of turns decrease, the control circuit requires less resistance to provide a wide range of control. Using a tapered rheostat, the number of turns on the control winding was arbitrarily set at 4000. For rectifying the charging current to the battery, rectifiers having silicon diodes were used since they increase the efficiency of the organization considerably over the usual copper oxide rectifiers. It is realized, however, that rectifiers having silicon diodes are old in the art and no claim for such rectifiers is intended to be made herein.

Looking now at FIG. 2 of the drawing which shows one proposed circuit for the battery charging regulation in conjunction with a two-rate relay, it will be apparent that when the battery B is charged, the two rate charging relay 2CHR is energized from the positive terminal of the battery through the windings of the charging relay, through the front contact of a track relay to the negative terminal of the battery. With back contact 12 of relay 2CHR held open, the limiting resistance LR is connected in series with the load R. Such increased resistance lowers the reluctance in the control winding C and provides less opposition for the flux generated by the primary winding. This then will reduce the charge on the battery B connected across the secondary winding S, however, a constant trickle charge will still be maintained.

Assuming, however, that conditions are such that the battery should be discharged to a point where the current output of the battery is below the drop away value of the charging relay 2CHR, the relay will be deenergized, closing back contact 12, shunting the limiting resistor LR and decreasing the amount of load across the control winding C. Such decrease in resistance raises the reluctance in the control winding C. An increase in reluctance in the control winding changes the impedance in the primary winding P requiring more current to flow from the primary to balance the flux across the secondary and control legs. Such increase in current obviously raises the charging current to the battery B all in accordance with the invention described hereinbefore.

A track relay TR has been schematically shown in FIG. 2 to illustrate another means whereby the battery B will receive a high charge such as that described above. This track relay could also be a time relay or any other effective means for causing the two-rate relay 2CHR to drop away upon the occurrence of some foreign event. Hence, when the track relay, in this instance is shunted in the usual manner due to the entrance of a train into a track section, contact 13 of the track relay will drop away interrupting the energizing circuit for the two-rate relay 2CHR. As explained before, the deenergization of said two-rate relay will close contact 12 of relay 2CHR shunting out the limiting resistance LR and decreasing the amount of load across the control winding C. Such decrease, of course, raises the reluctance in the control winding, changes the impedance in the primary winding P, thereby requiring more current to flow from the primary. Such increase in current will increase the charging current to the battery B as explained above.

Any major change due to unusual conditions can be easily adjusted by manual adjustment of the rheostat thereby varying the load across the control winding. With the regulating organization arranged in the manner described, it is apparent that if the load current increases, due either to a decrease in load resistance or an increase in the potential which is impressed on the primary winding P, a redistribution of the flux will take place in the secondary and control cores causing more or less flux to pass through the secondary winding as the case may be.

Having thus described one specific form which the invention may take it should be understood that various adaptations, modifications and additions may be made in the specific structural organization shown and described, without departing from the spirit and scope of the present invention.

What I claim is.

1. A voltage regulation system having output terminals adapted for connection to a load including a battery and a two-rate relay connected in shunt comprising, in combination, an alternating current source, a transformer including three parallel core portions, primary coil means wound on one of said core portions and disposed for connection to said source, secondary coil means wound on one of the remaining core portions with said output terminals being taken from a connection to an intermediate point of said secondary coil means and the common connection of the ends of said secondary coil means, restification means connected in the common connection of the ends of said secondary coil means, control coil means wound on the other of said remaining core portions, variable resistance means adapted to shunt said control coil means for varying the reluctance of its core portion, circuit means responsive to the deenergized condition of said two-rate relay for shunting a portion of said resistance means thereby effectively increasing the reluctance of said other core portion and the value of rectified charging current delivered to said battery.

2. A voltage regulation system as defined in claim 1 wherein said variable resistance means includes a variable resistance and a limiting resistance, said variable resistance being set to a position for including a suitable resistance value in addition to said limiting resistance in shunt with said control coil means for normally permitting a small current to effectively trickle charge said battery.

3. A voltage regulation system as defined in claim 2 wherein said circuit means includes a back contact of said two-rate relay connected in shunt with said limiting resistance for providing a bypass circuit around said limiting resistance according to the deenergized condition of said two-rate relay, whereby the resistance of said variable resistance means is decreased and the reluctance of said core portion for said control coil means is increased to thereby effectively increase the rate of the charging current delivered to said battery.

4. A voltage regulation system as defined in claim 3 wherein a track relay is included with a front contact thereof being included in the shunt circuit for controlling said two-rate relay, whereby the energizing circuit for said two-rate relay is interrupted when said track relay is dropped away in response to a train shunt and the charging current delivered to said battery is increased for the duration of such dropped away condition of said track relay.

References Cited in the file of this patent

UNITED STATES PATENTS

| | | |
|---|---|---|
| 1,995,652 | Reichard | Mar. 26, 1935 |
| 2,346,997 | Priest | Apr. 18, 1944 |
| 2,423,114 | Potter | July 1, 1947 |
| 2,519,426 | Grant | Aug. 22, 1950 |
| 2,674,713 | Sargeant et al. | Apr. 6, 1954 |
| 2,685,057 | Gilchrist | July 27, 1954 |
| 2,686,291 | Macklen | Aug. 10, 1954 |
| 2,753,510 | Smith | July 3, 1956 |

OTHER REFERENCES

E.E. staff M.I.T., Applied Electronics, J. Wiley (1943), pp. 359–60 (TK 7860 M3).